US006795230B1

(12) United States Patent
Vincent et al.

(10) Patent No.: US 6,795,230 B1
(45) Date of Patent: Sep. 21, 2004

(54) SELF-ASSEMBLED MOLECULAR COLOR SWITCH

(75) Inventors: Kent D. Vincent, Cupertino, CA (US); Xiao-An (Sean) Zhang, Sunnyvale, CA (US); Zhang-Lin Zhou, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/465,378

(22) Filed: Jun. 18, 2003

(51) Int. Cl.[7] .................................................. G02B 6/26

(52) U.S. Cl. ......................................... 359/321; 385/16

(58) Field of Search ................................ 359/321, 320; 385/16, 141; 438/99; 257/40; 365/151

(56) References Cited

U.S. PATENT DOCUMENTS

| | | | |
|---|---|---|---|
| 6,556,470 B1 | | 4/2003 | Vincent et al. |
| 6,624,002 B2 | * | 9/2003 | Bratkovski et al. ............ 438/99 |
| 6,628,016 B2 | * | 9/2003 | Michl et al. ................... 310/10 |
| 6,701,035 B2 | * | 3/2004 | Zhang et al. .................. 385/16 |

* cited by examiner

Primary Examiner—Scott J. Sugarman
Assistant Examiner—Richard Hanig

(57) ABSTRACT

A self-assembled molecular color switch is formed on a substrate and comprises coupled coaxial rotors and non-coaxial stators, with each rotor rotatably connected to two stators, to form molecular planes wherein all rotors at rest are parallel to the substrate and orthogonal to an electric field. The color switch employs a novel chemistry for producing a molecular film having a field switchable color. More particularly, it is a chemistry that provides for relatively thick self-assembled molecular layers collectively having print-like optical density. Further, a means for bi-stable color switching is provided.

63 Claims, 9 Drawing Sheets

SELF-ASSEMBLED MOLECULAR COLOR SWITCH

CROSS-REFERENCE TO RELATED APPLICATIONS

The present application is related to application Ser. No. 10/465,409, filed on even date herewith and entitled "New Cross-Linking Process for the Preparation of 1-Dimensional and 2-Dimensional Moletronics and Display Materials". That application is directed to methods for fabricating the structures disclosed and claimed herein.

The present application is also related to the following applications and patents: Ser. No. 10/187,720, now U.S. Pat. No. 6,701,035, entitled "Electric Field Actuated Chromogenic Materials Based on Molecules with a Rotating Middle Segment for Applications in Photonic Switching", and filed on Jul. 1, 2002, in the names of Xiao-An Zhang et al; Ser. No. 09/898,799, entitled "Bistable Molecular Mechanical Devices Activated by an Electric Field for Electronic Ink and Other Visual Display Applications", and filed on Jul. 3, 2001, in the names of Xiao-An Zhang et al; Ser. No. 09/846,135, now U.S. Pat. No. 6.674.932, entitled "Bistable Molecular Mechanical Devices with a Middle Rotating Segment Activated by an Electric Field for Electronic Switching, Gating, and Memory Applications", and filed on Apr. 30, 2001, in the names of Xiao-An Zhang et al; Ser. No. 09/932,186, entitled "Devices Activated by an Electric Field for Electronic Ink and Other Visual Display Applications", and filed on Aug. 17, 2001, in the names of Xiao-An Zhang et al; Ser. No. 09/823,195, entitled "Bistable Molecular Mechanical Devices with a Band Gap Change Activated by an Electric Field for Electronic Switching, Gating, and Memory Applications", and filed on Mar. 29, 2001 in the names of Xiao-An Zhang et al; Ser. No. 09/919,394, entitled "Field Addressable Rewritable Media", and filed on Jul. 31, 2001, in the names of Kent D. Vincent et al, now U.S. Pat. No. 6,556,470, issued Apr. 29, 2003', and Ser. No. 09/844,862, entitled "Switching Applications", and filed on Apr. 27, 2001, in the names of Xiao-An Zhang et al. The contents of the foregoing patent applications are incorporated herein by reference.

The present application is further related to the following applications: Ser. No. 10/016,560, entitled "Hard Copy System Including Rewritable Median, and filed on Oct. 31, 2001, in the names of Kent D. Vincent et al; Ser. No. 09/978,384, entitled "Portable Electronic Reading Apparatus", and filed on Oct. 16, 2001, in the names of Kent D. Vincent et al; Ser. No. 10/051,669, entitled "Scanning, Copying and Printing with Rewritable Media", and filed on Jan. 17, 2002, in the names of Kent D. Vincent et al; Ser. No. 09/981,166, entitled "High Resolution Display", and filed on Oct. 16, 2001, in the names of Kent D. Vincent et al; Ser. No. 10/021,446, now U.S. Pat. No. 6,670,981 entitled "Laser Printing with Rewritable Media", and filed on Oct. 30, 2001, in the names of Kent D. Vincent et al; and Ser. No. 10/171,060, entitled "Color Display with Molecular Light Valve", and filed on June 13, 2002, in the names of Kent D. Vincent et al. The contents of the foregoing patent applications are incorporated herein by reference.

TECHNICAL FIELD

The present invention is directed to color switches, and, in particular, to color switches based on molecules including rotor and stator components as part of their structure.

BACKGROUND ART

Switching molecules capable of changing color from one state to another under the influence of an electric field are the subject of ongoing investigation. In general, the color change occurs through a molecular conformation change that alters the degree of electron conjugation across the molecule and, thereby, its molecular orbital-induced HOMO-LUMO (highest occupied molecular orbital—lowest unoccupied molecular orbital) states. In one particular embodiment, the conformation change occurs through the field rotation of a ring or rings within the molecule. In this instance, the conjugation is broken between the rotating rings, called rotors, and ring structures that do not rotate, called stators. The rotors have electric dipoles that induce rotation within a given field. A coupling group (e.g., acetylene) between the rotor and stator elements serves as a "bearing" and conjugation bridge between the rotor and stator.

The novel molecular color switch promises a unique set of dye-like optical properties that make it ideal for applications such as electronic paper, paper-like displays, electronic books, projection displays and the like.

A major challenge in the development of the molecular color switch is the need for self-assembled colorant layers on the order of 0.05 to 1.0 micrometer in thickness. Each switch molecule in the colorant layer used in print or display media must be correctly oriented with respect to the switching field and be spaced sufficiently from other molecules to allow unhindered rotation of the switching rotors. Such spacing and alignment must be repeated over a colorant thickness sufficient to achieve the optical density typical of commercial print (nominally 0.5 to 1.0 micrometer). A related challenge is to design the colorant layer for cost-effective switching voltages and addressing. Yet another challenge is to design a colorant layer that switches from a highly conjugated black to transparent state under such low switching voltages. A still further challenge is to design a means to constrain the stator sections of the molecular switch to prevent rotation with rotor rotation. The lowest conformational energy state of the typical molecular switch provides for planar rotors and stators. Unconstrained, the rotor and stator will naturally want to rotate together, vitiating any desired color change. Yet another challenge is to design a colorant layer that provides high optical density with minimized switching voltage. Still further, there is the challenge of providing a means for creating specific subtractive colors, such as cyan, magenta and yellow meeting the above rotor orientation and switching voltage needs. Further yet, there is the challenge of providing a means for bi-stable color switching enabling the colored and transparent states to remain stable indefinitely in the absence of a field. Bi-stable operation enables such applications as electronic paper and electronic books. It also provides the lowest energy alternative for display related applications since no holding voltage is required to maintain a pixel and only pixels needing to change are switched.

In the foregoing applications, a general stator constraint and molecule spacing scheme involving bulky side groups on stators has been described. Such bulky groups might include attachment of one or more carbon tetrahedrons having three phenyl rings, for example. This approach, however, has been found to have some drawbacks. Most notably, such bulky groups have large interstitial spaces that do not provide inter-molecular spacing function, allowing the potential that adjacent molecules may be poorly spaced. For the same reason, the bulky side groups do not inherently guarantee molecule alignment with the field and likely inhibit field-induced alignment during colorant film formation. Furthermore, the above-referenced applications do not provide chemistry specific to optically thick colorant films nor bi-stable switch operation.

Thus, there is a need to provide thin molecular films having an electric field switchable color, providing print-like optical density at low switching voltage.

DISCLOSURE OF INVENTION

In accordance with the embodiments disclosed herein, a selfassembled molecular color switch comprising coupled coaxial rotors and non-coaxial stators, with each rotor rotatably connected to two stators with a connector, to form a plurality of spaced molecular planes of interconnected polygon cells, wherein all rotors at rest are parallel and orthogonal to an electric field.

BEST MODES FOR CARRYING OUT THE INVENTION

Figure 1A:
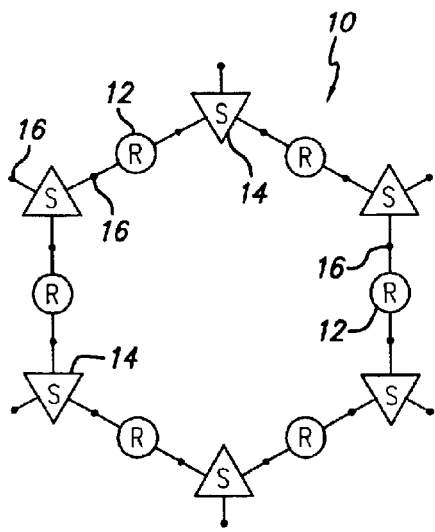
FIGS. 1a–1d each schematically depict an arrangement of rotors (R) and stators (S), illustrating different embodiments, including a generic hexagon cell (FIG. 1a), a square cell (FIG. 1b), a rectangular polygon cell (FIG. 1c), and a generic honeycomb structure suitable for creating specific switchable dye colors (FIG. 1d)

Reference is made now in detail to specific embodiments, which illustrates the best mode presently contemplated by the inventors for practicing the invention. Alternative embodiments are also briefly described as applicable.

Construction

In accordance with the teachings herein, the general molecular switch of the present embodiments comprises molecular rotors, stators, couplers, and spacers. Specific to these teachings, the rotors, stators, and couplers are configured to form a series of parallel stacked planes, each spaced from the other by at least one and preferably three or more spacer groups. The number of spaced planes is at least two, and may comprise up to several such planes, there being, in theory, no limit to the number of planes that could be so stacked.

The rotors and stators are preferably constructed from planar, conjugated single or fused ring elements, each having no appreciable spectral absorption in the visible range. Such rings are represented by, for example, benzene, naphthalene, anthracene, phenanthrene, pyrrole, furan, thiophene, imidazole, oxazole, thiazole, pyrazole, pyridine, pyrimidine, purine, quinoline, isoquinoline, carbazole, indolizine, indole, isoindole, indoline, benzofuran, benzothiophene, indazole, benzimadazole, benzthiazole, quinolizine, cinnoline, phthalizaine, quinazoline, quinoxaline, naphthyridine, pteridine, indene, azulene, isoxazole, isothiazole, oxadiazole, triazole, thiadiazole, pyran, pyridazine, pyrazine, and triazine. A stator may also comprise a non-cyclic planar molecule such as triethynyl amine. As shall become apparent below, appropriate selection will depend on the spatial, coupling, conjugation and pendant group needs of the rotors and stators.

The couplers connect and conjugate the rotors and stators. Such conjugation generally provides a planar structure of rotors and stators in one of their stable conformation states. When conjugated, the spectral absorption of the rotor and stator molecule shifts toward longer wavelengths with higher extinction coefficients than realized with the individual rotor and stator components. The rotor-coupler bond further provides a bearing point for rotor rotation. Acetylene, ethane, imine, and azo coupler groups are well suited for this purpose. Acetylene couplers are used throughout this disclosure by way of example. However, the present embodiments are not so limited. In many cases, acetylene is preferred because it extends conjugation between rotors and stators through a linear axis.

The rotors require coupling points and couplers that provide a single axis of rotation. A coupling point herein refers to the position on the rotor to which a coupler bond is made to an adjacent stator. Conventional position numbering schemes for cyclic compounds are used to describe the coupling points. A single axis of rotation for a benzene or naphthalene-based rotor is obtained, for example, through coupling points at the 1 and 4 ring positions.

The rotors likewise require an appropriate electric dipole that is most preferably orthogonal to the axis of rotation. The magnitude of the orthogonal dipole vector determines the torque that is applied to turn the rotor within a given field. Dipoles are created when an electron donor and/or acceptor group is placed on the rotor, creating separated positive and negative charge centers across the rotor. The vector sum of the product of the magnitude of the charges produced by such groups and their orthogonal spacing from the rotor axis of rotation determines the orthogonal dipole vector. Thus, the bonding position of the donor-acceptor groups on the rotor, the type of donor-acceptor group, and the size of the rotor selected are each important elements in determining the magnitude of the dipole moment. In general, it is preferable to maximize the size of the dipole without adversely impacting the rotational spacing needs of the planes.

Larger spacing distances increase the thickness of the colorant layer, consequently increasing the voltage required to switch the layer for a given field requirement. One skilled in the art will recognize that there are many suitable donor and acceptor groups to select from. Metal salts and complexes perhaps represent the strongest charge generators. Metal salts may be formed, for example, by the reaction of alkali and alkaline earth metals with organic acids. Metal complexes commonly comprise metals and electron withdrawing groups such as oxides, halides, nitrides, and the like. Rotors based on tolylcupric chloride (Formula (a))

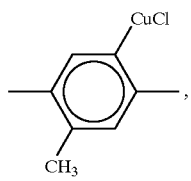

(a)

benzyl magnesium chloride, phenyl germanium trichloride, phenyl tin trichloride, and phenyl zinc halide are representative of such complexes.

Electronegative moieties such as trifluoro methyl, nitro, cyano and organic acids also produce suitable dipoles, as well as electropositive moieties such as amino groups. Such groups may be bonded to any of the 2, 3, 5, 6 positions of a benzene rotor having 1,4 coupling bonds, for example. Rotors based on nitrobenzene (Formula (b))

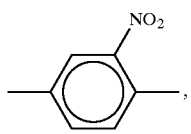

(b)

and aniline are representative of such dipoles, as well as rotors having both electronegative and electropositive groups diametrically opposed on the rotor (e.g., nitro and amine groups, respectively).

Orthogonal dipoles can be obtained through donor-acceptor groups that symmetrically bond to both the 2 and 3 positions of such benzene rotors. Such dipoles are represented by phthalimide (Formula (c)):

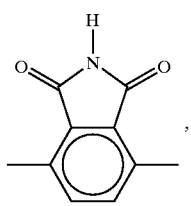

(c)

phthalhydrazide, phthalic acid (Formula (d)):

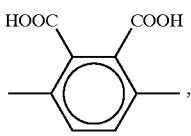

(d)

phthalic anhydride (Formula (e)):

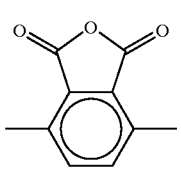

(e)

phenanthroquinone (Formula (f)):

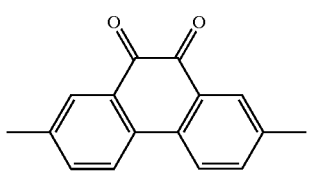

(f)

and catechol, their salts and metal complexes. Rotors based on barium chloride phthalimide and bromocatecholborane are representative of such orthogonal dipoles.

The rotor herein may also comprise two or more rotor elements linked together, as shown by example in Formula (g) (coupled bond):

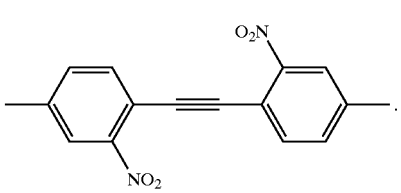

(g)

Such linkage increases the effective dipole moment by the multiplication of rotor elements acting to de-conjugate adjacent rotors and stators during color switching. Two identical rotor elements, for example, provide twice the de-conjugation torque as one element. Rotor linkage provides an excellent means to increase effective rotor dipole moment without increase in the rotational spacing needs of the molecular planes. For the purposes of these teachings, thusly-linked rotor elements are considered as a single rotor. Care must be taken in selection of rotor, dipole functional group(s) and linking to assure that the resultant rotor is transparent. Such transparency may be achieved by selecting dipole functional groups that are not conjugated with the rotor ring. More than one coupling group may be employed between rotors to space the dipole functional groups to limit their mutual charge repulsion.

The stators herein may be bonded to rotors through couplers as well as bonded to other functional elements of the dye molecule. Such other functional elements may include inter-planar spacers, linkages between stators within a given plane, auxochromic moieties that tune the absorption spectra of the rotor-stator chromophore, photo-stabilizing moieties such as phenolic hydroxies, photon-energy dissipation moieties, and coating solution solubilizing or dispersing groups.

The stators require two or more non-coaxial bonding points to prevent an axis of rotation. A bonding point has the same definition as a coupling point, only broadened to include bonds with other functional elements that are capable of restraining rotation, as well as couplers. For example, the 1 and 3 bonding points on a benzene-based stator are non-coaxial. By the same definition, the 1, 4, and 5 bonding points are collectively non-coaxial, since the 1 and 5, and 4 and 5 coupling points are non-coaxial. While the 1 and 4 coupling points are coaxial, in this example, the 5 position coupling point prevents stator rotation about the 1–4 position axis.

The non-coaxial bonding points used to prevent stator rotation must, of course, each be bonded to other elements of the molecule or adjacent molecules capable of constraining stator rotation. A bonding point used to attach an otherwise non-attached auxochrome or photo-stabilizing moiety like a hydroxy group, for example, is not included in the definition of non-coaxial bonding points for these teachings, since the bonded moiety is not adequately capable of restraining stator rotation. The linkages emanating from a given stator are, hereinafter, referred to as branches.

The primary function of a stator is chromophoric in that it adds conjugation to a circuit of rotors and stators. In many, if not most cases, it is desirable to extend conjugation across two or more branches of the stator. In other cases, it is desirable to terminate conjugation designing the stator so that conjugation is broken between one or more branches. As is well known in the chemistry art, conjugation occurs through the uninterrupted sequence of alternating single and double/triple bonds. Certain branch points around ring structures provide conjugation while others do not. For example, the 1, 2, 4, and 6 carbons on a benzene ring are conjugating branch points, while the 1, 3, and 5 are not. Thus, 1,4-di(ethynyl) benzene, 1,2-di(ethynyl) benzene, 1,2,4-tri(ethynyl) benzene and 1,2,4,6-tetra(ethynyl) benzene are each acetylene branched stators having full branch-to-branch conjugation. On the other hand, 1,3,5-tri(ethynyl) benzene has no branch-to-branch conjugation and serves as a conjugation terminator. Certain other stators have selective branch-to-branch conjugation. For example, 1,2,4,5-tetra(ethynyl) benzene has conjugation across all branch points except 1 and 5. Similar combinations occur in all fused ring stators. For example, 1,5-di(ethynyl) naphthalene and 1,5-di(ethynyl) anthracene have branch-to-branch conjugation. These and like combinations of non-coaxial, conjugating branch points are particularly useful and a key element in the present embodiments. A number of novel preferred stators will be introduced later below.

The rotors and stators herein preferably have bonding groups that allow self assembled coupling of each in a repeated rotor-stator-rotor sequence. In such a sequence, rotors will generally have a reactant moiety A and stators a reactant moiety B, wherein A and B react together heterogeneously but neither react homogeneously. Preferably, but not necessarily, one of the reactants includes the coupler. For example, the stator may include an acetylene coupling group at one or more of its non-coaxial bonding sites. Such acetylene group(s) serves as reactant moiety B. The rotor may, in the same example, have a halide atom (e.g., iodine, bromine, etc.) or other type of active leaving groups (e.g., $-O-SO_2CF_3$, $-O-SO_2CH_3$, $-O-SO_2C_6H_4CH_3$, etc.) at each of its coaxial coupling sites, serving as reactive moieties A. The addition of the aryl halide and acetylene functional reactants couples the rotor and stator via the acetylene, liberating hydrogen halide in the process. AB reaction moieties suitable to these embodiments are numerous and well known in the art of chemistry. Any reactive moiety or moieties that allows self-assembly of the present rotor-stator planar structure is considered within the scope of the present embodiments.

The AB self-assembly of rotors and stators having coaxial coupling and non-coaxial bonding points, respectively, allows large contiguously conjugated strands and planar webs of alternating rotors and stators to be fabricated. Such extensive conjugation provides a number of significant benefits relative to a switchable colorant layer. First, extensive conjugation provides an inherent black colorant with high extinction coefficient. High extinction coefficients promote thinner colorant layer thickness for a desired color density and, thereby, lower colorant switching voltage. Second, the conjugation broken by each rotor may be minimized since the colorant-required conjugation is distributed over many rotors and stators instead of concentrated over only a few rotors. This lowers the energy impact of conformation change that a given rotor must overcome, lowering the necessary torque and switching field (voltage) needed to break conjugation. Third, a two-dimensional web of rotors and stators provides a planar structure that may be stacked in parallel to form a colorant film wherein all rotors are parallel to the media substrate at rest and, thereby, optimally orthogonal to the switching electric field.

While AB reactions are discussed above, it will be appreciated by those skilled in this art that AA (and BB) reactions may alternatively be employed to provide self-reaction of rotor-stator pre-assemblies.

The present embodiments may also include structural elements, hereinafter referred to as linkers, that link strands of rotors and stators within a given plane. In one embodiment, such links are periodically made between stators in a manner that assembles the strands into a substantially planar web structure. The links may or may not conjugate the linked stators. An alkyl chain is an example of a simple linker. The linkers may include a spacer element or bonding site for a spacer element. Spacers are structural elements that adjoin and space adjacent planes.

The foregoing describes the basic elements that compose the novel planar colorant structure of the present embodiments. A more detailed description of each shall now be made in the context of preferred planar structures for dendrimeric self-assembly, uniform plane spacing, high extinction coefficient black, non-black colorants, and bi-stable switching function.

Preferably, the rotors and stators herein are assembled in repeated arrays of polygon cells forming a planar honeycomb structure. Most preferably, the polygon cells are uniform in size and isometric in vertex angle and side length to promote a fully uniform honeycomb plane having no interior fragments. The vertex of each polygon cell is formed by a stator having three or more branches for coupling or otherwise bonding to elements in the sides of the polygon cell and the mating sides of adjacent cells in the honeycomb. Most preferably, the stator has fully symmetrical branches emanating from its vertex point so that stator orientation within the formed plane does not impact formed cell structure or integrity. A generic hexagon cell 10 having rotors (R) 12 and stators (S) 14 is shown in FIG. 1a. The black dot 16 between stators 14 and rotors 12 depicts a coupler. Here, the stator 14 has three symmetrical branches uniformly emanating at 120° angular spacing. The sides of the polygon 10 comprise identical rotors 12.

Figure 1E:
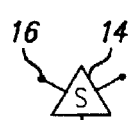
FIGS. 1e–1h each schematically depict a variety of generic stators.
Figure 1F:
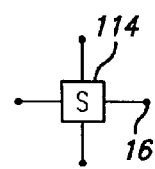
Figure 1G:
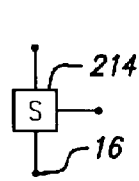
Figure 1H:
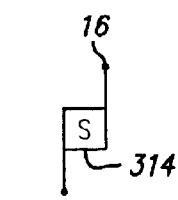
Figure 1B:
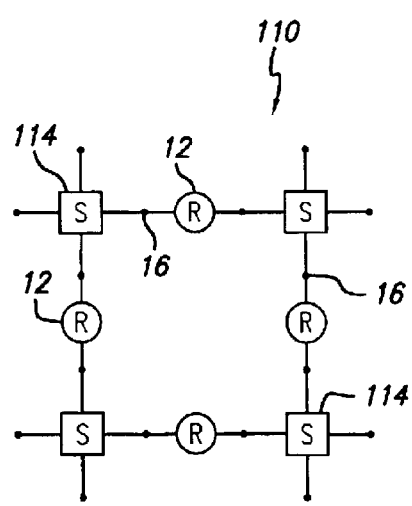

A similar structure is found in FIG. 1b wherein the cell 110 is a square formed through stators 114 having four fully symmetrical branches emanating at 90° angular spacing. Again, the perfect symmetry produces identical square cells 110 independent of stator 114 orientation within the formed plane. Such freedom of orientation greatly benefits plane self-assembly.

The coupled rotors and stators herein form planes because the minimum assembly conformation energy occurs when the conjugated pi (π) orbitals across the structure each maximally overlap (are aligned in parallel). Thus, isometric stators, uniformly dimensioned rotors, and couplers reacted in the correct stoichiometric proportion theoretically form perfect honeycomb planes having identical polygon cells. In this case, each plane is identical to the next, a factor that greatly aids plane spacing and a factor that enables color switch bi-stability, as shall be discussed later below.

When the stators 14, 114 of FIGS. 1a and 1b have branches that are collectively conjugated, then the honeycomb structure 10, 110 allows the creation of a natural black switchable colorant with high extinction coefficient. In this sense, the structure assumes a graphitic character. As is well known with fused aromatic rings, the expansion of contiguous conjugation extends spectral absorption to include longer wavelengths while simultaneously increasing spectral extinction (absorption) coefficients. High extinction coefficients are, again, highly desirable for lowering the switching voltage required on devices that employ the novel colorant of the present embodiments. Included in this disclosure is a set of novel stators that provide each of the symmetry, coupling, and conjugation properties required to produce such a high density black colorant.

Figure 1C:
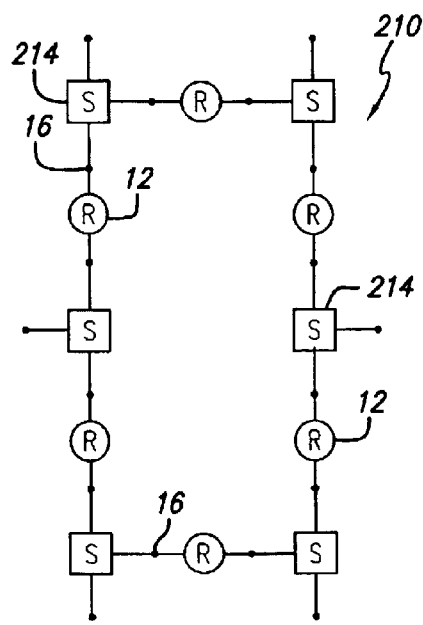

A third generic structure of the present teachings is found in FIG. 1c wherein the stator 214 has three branches emanating at 90°, 90° and 180°, respectively, providing a rectangular polygon cell 210. The cell structure 210 in FIG. 1c is not isometric and therefore generally requires some rotor-stator preassembly to limit fragments within the produced honeycomb self-assembly. An example of such preassembly shall be discussed later below.

Figure 1D:
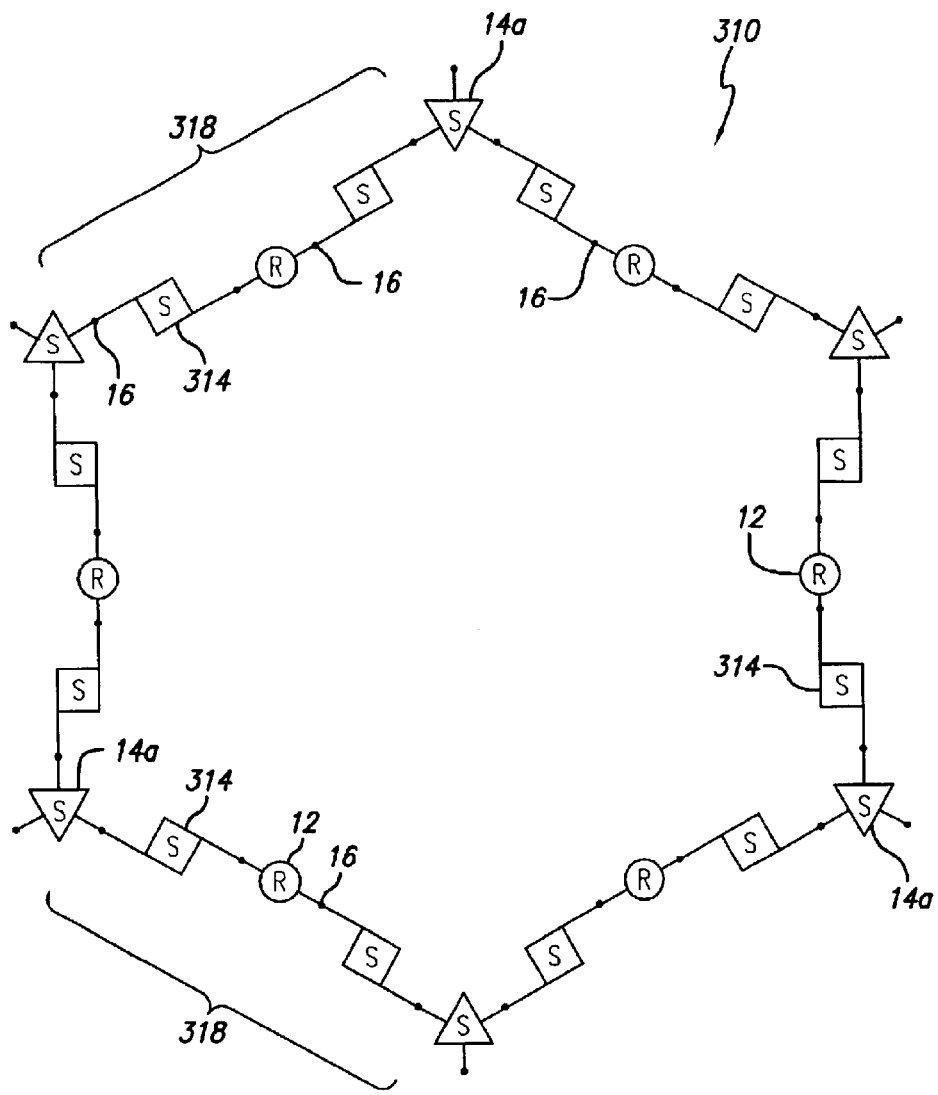

FIG. 1d shows a fourth generic planar honeycomb structure 310 suitable for creating specific switchable dye colors such as common cyan, magenta and yellow. In this instance, the symmetrical stators 14a at each polygon vertex have non-conjugated branches and the polygon sides 310' comprise common dye chromophores 318 compatible with the present general coaxial rotor 12, non-coaxial stator 314 requirement By avoiding through conjugation between vertex stator branches, the dye molecules 318 along the polygon sides may be coupled to the vertex stators 14a without significantly changing the spectral character of the dyes. Examples of suitable vertex stators 14a having no through conjugation include 1,3,5-tri(ethynyl)benzene, tri(ethynyl) amine and cyanuric chloride. Dye 318 bonding to such vertex stators 14a should be done in a manner that provides conjugated coupling to the stator to maintain planarity. One skilled in the colorant art will recognize that there are many dye structures that can be adopted to meet the operational and chemical needs of the present teachings. Disazo dyes, such as Sudan Red B, are particularly well suited since they typically comprise three (fused) ring structures linked through azo couplers. In this instance, the center ring may be adopted for the rotor 12 function, the outer rings for stators 314. This generic structure is shown in the polygon side chemistry of FIG. 1d and later in FIG. 6c (acetylene couplers shown in place of azo). Such dyes generally contain auxochrome moieties attached to the rings to tune the specific hue of the dye. Such auxochromes may likewise be used in the present embodiments for dipole and bonding purposes as well. The reference volume, "Colour Index" published by the Society of Dyers and Colourists (Great Britain), is included herein by reference as a treatise on. dye structure and inclusive of most dyes in commerce. It should be recognized that rotor symmetric dyes (rotor 12 in center of dye 318) in use with isometric vertex stators 14a are capable of forming the theoretically perfect, self-assembled, planar honeycomb structures described above for FIGS. 1a and 1b.

A series of novel stators will now be described in reference to the generic stators 14, 114, 214, 314 shown in FIGS. 1a–1d, respectively. For reference, the generic stators 14, 114, 214, 314 are shown separately in FIGS. 1e–1h, respectively. As is common throughout this disclosure, the stators are shown with acetylene couplers 16. Inclusion of the couplers 16 allows a more instructive view of the geometry and conjugation of the stator branches. As stated before, the stator bonding sites may be designed to link through a variety of chemistries, including couplers.

Figure 2A:
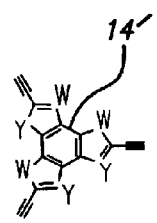
FIG. 2a depicts a specific embodiment of a novel stator, namely, 2,5,8-tri(ethynyl)-trisindene.
Figure 2B:
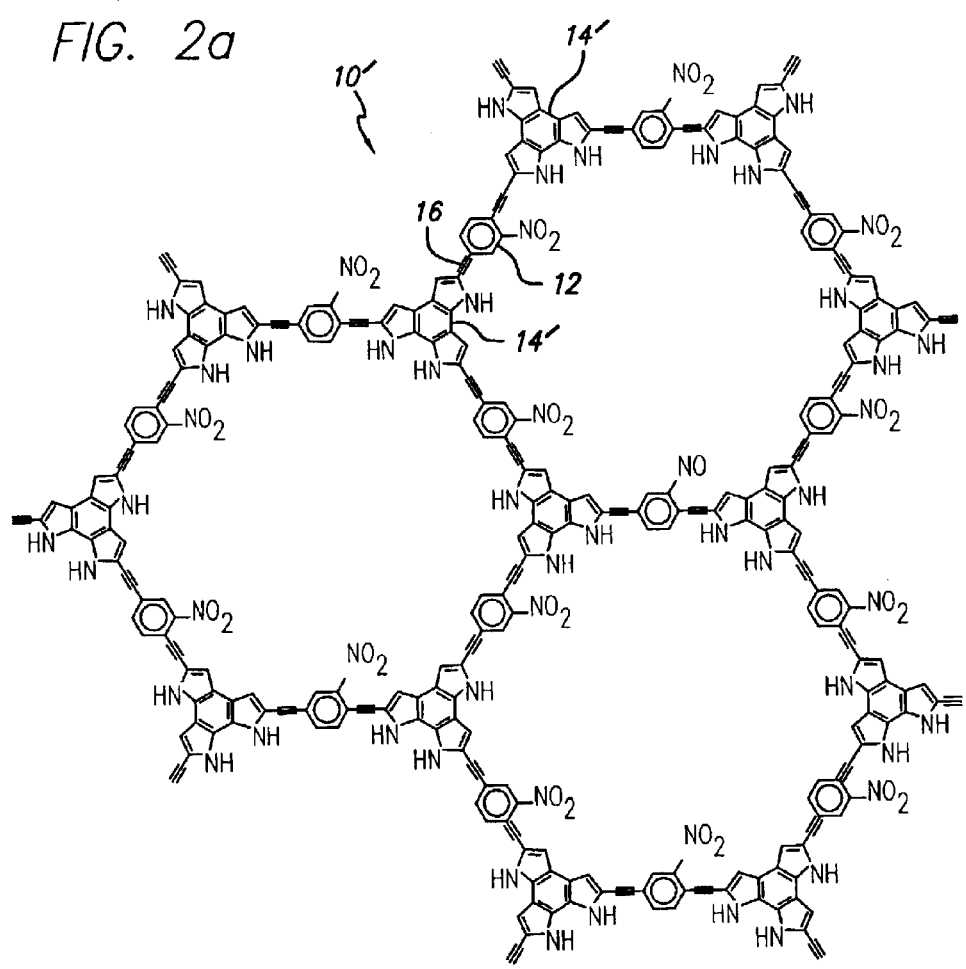
FIG. 2b illustrates a portion of the single plane honeycomb structure produced by the equi-molar addition of 2,5,8-tri(ethynyl)-benzo-trispyrrole and nitrobenzene.

The novel stator 14' shown in FIG. 2a is 2,5,8-tri (ethynyl)-trisindene and is of the type 14 shown generically in FIG. 1e. The Y and W atom designations refer to atom substitutions including, in addition to carbon, nitrogen, oxygen, sulfur, phosphorus, arsenic or other common ring substituents, as appropriate with the given valence constraints. Hetero atom (e.g., nitrogen, sulfur, oxygen) substitution is particularly favored for metal or acid-base spacer complexation, as described later below. The fused ring structure of one benzene ring and three pentacycle rings provides a novel combination of branch symmetry about the stator vertex point and branch-to-branch conjugation. Such conjugation occurs through atom pathways in which alternating single and double (or triple) bonds are not disrupted (e.g., through a single-single bond). Not all combinations of heteroatoms produce a transparent stator, so care must be exercised in stator selection when a transparent color state is desired. FIG. 2b shows a portion of the single plane honeycomb structure 10' produced by the approximately equimolar addition of 2,5,8-tri(ethynyl)benzotrispyrrole (Y=nitrogen, W=carbon) and the nitrobenzene rotor described above.

Figure 3A:
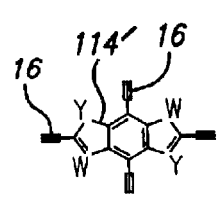
FIGS. 3a–3b depict the novel stators 2,5,7,8-tetra (ethynyl)bisindene and 2,5-di(ethynyl)-7,8-di(ethynyl ethynyl)-bisindene, respectively.
Figure 3B:
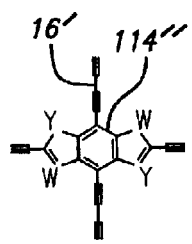
Figure 3C:
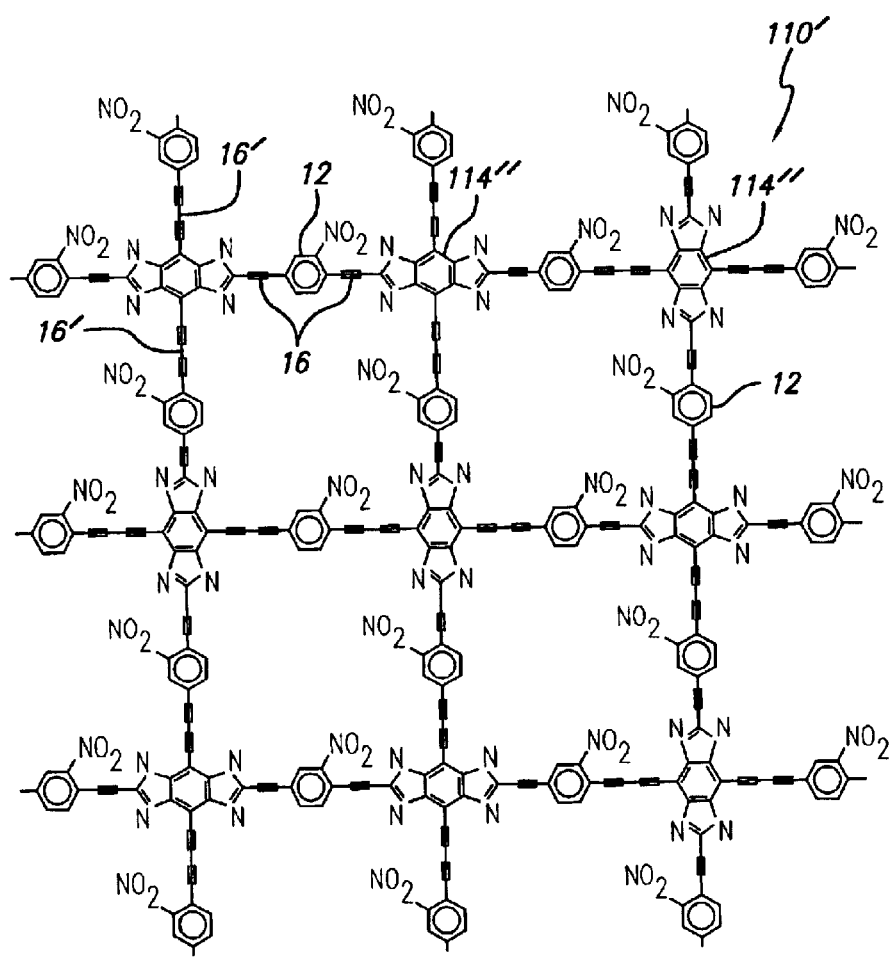
FIG. 3c illustrates a portion of the planar square-cell honeycomb structure formed through the equi-molar addition of 2,5-di(ethynyl)-7,8-di(ethynyl ethynyl) benzo-bisimidazole and nitrobenzene.

The novel stators 114', 114" of FIGS. 3a and 3b, respectively, are 2,5,7,8-tetra(ethynyl) bisindene and 2,5-diethynyl-7,8-di(ethynyl ethynyl) bisindene, respectively (W=Y=C), and are of the type 114 shown generically in FIG. 1f. The tandem acetylene groups 16' shown in FIG. 3b provide the preferable axial symmetry between the vertical and horizontal branches of the stator 114" while maintaining branch-to-branch conjugation. The same Y and W atom substitutions described above are applicable here. Inclusion of Y and W atoms impacts the symmetry of the stator branches and should be factored in stator selection. A segment of the planar square-cell honeycomb structure 110' formed through the roughly equi-molar addition of 2,5-di (ethynyl)-7,8-di(ethynyl ethynyl)-benzo-bisimidazole (Y=W=nitrogen) with the nitrobenzene rotor described above is shown in FIG. 3c. This Figure shows a random planar orientation of the stator 114" to point out the structural benefit of symmetrical stators. The overall cell geometry and function of the honeycomb remains effectively unchanged by the orientation of the stator 114".

Figure 4A:
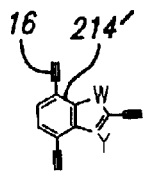
FIG. 4a depicts the stator 2,4,7-tri(ethynyl)-indene.
Figure 4B:
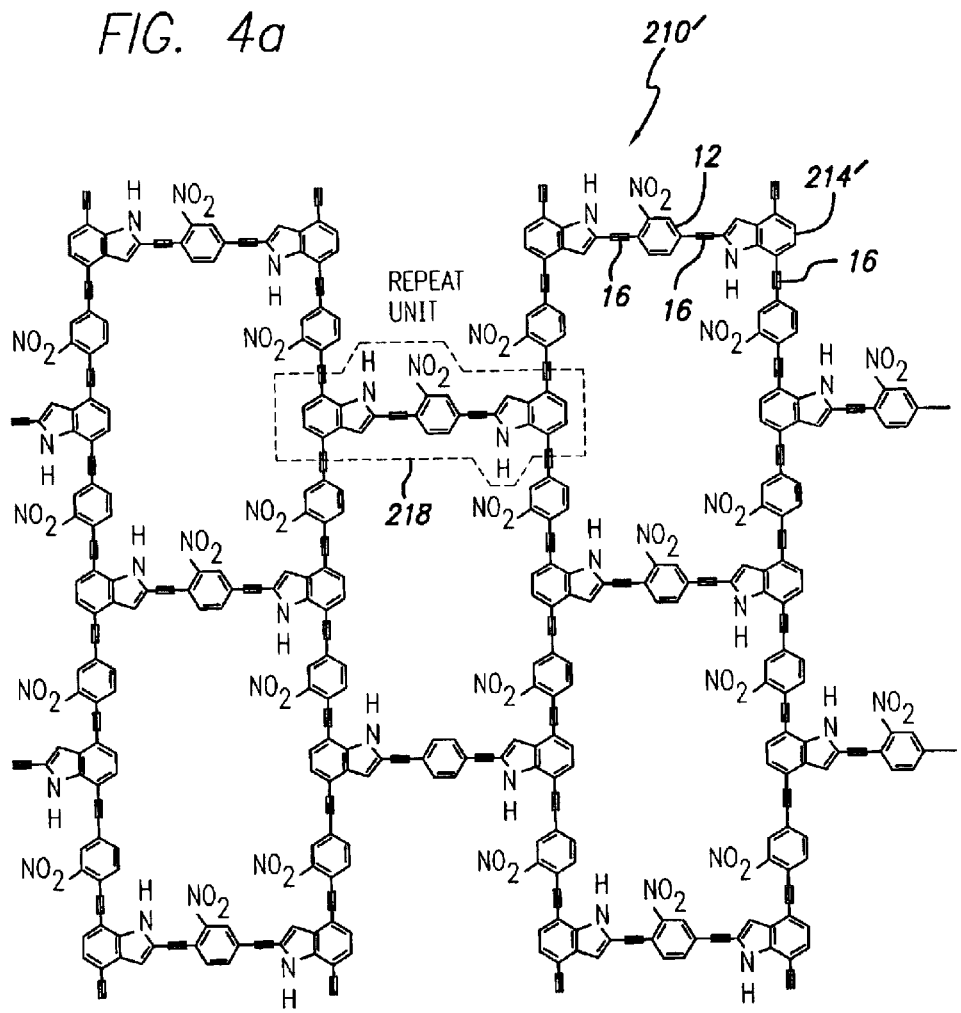
FIG. 4b illustrates the planar rectangular cell honeycomb structure formed through a pre-assembled repeat unit using two molar equivalents of 2,4,7-tri(ethynyl)-indole and three molar equivalents of nitrobenzene.

The novel stator 214' of FIG. 4a is 2,4,7-(triethynyl) indene and is of the type 214 shown generically in FIG. 1g. This stator 214' is applicable to the same Y and W atom substitutions as previously described. FIG. 4b shows a planar rectangular cell honeycomb structure 210' formed through a preassembled repeat unit 218 using two molar equivalent of 2,4,7-tri(ethynyl) indole (Y=nitrogen, W=carbon) and three molar equivalent of the nitrobenzene rotor described above. Other repeat units 218 may also be used in place of the one shown. The purpose of the preassembly is to minimize cell fragment creation when non-symmetric stators 214' are used. While FIG. 4b shows identical cell polygons, it should be recognized that the repeat unit 218 will produce rectangles of larger and smaller lengths, while theoretically maintaining the parallel spaced vertical (in FIG. 4b) rotor-stator strands.

Figure 5A:
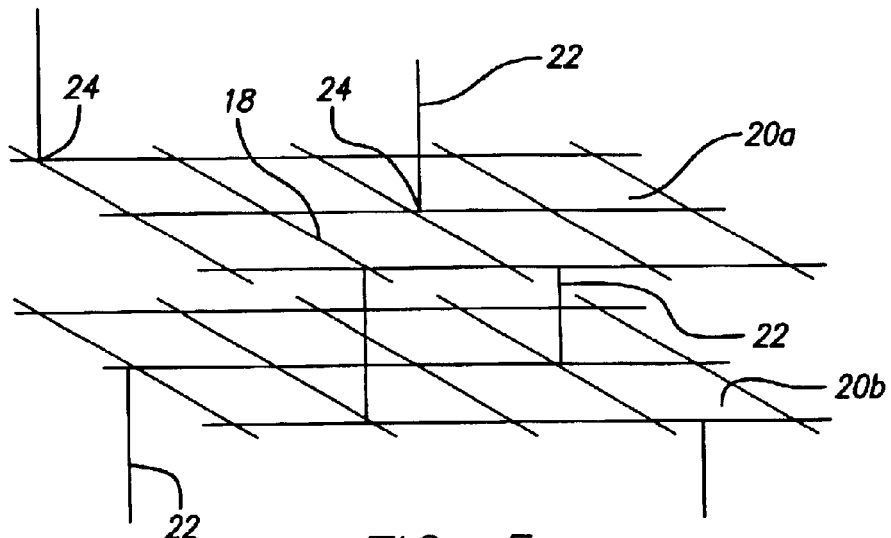
FIGS. 5a and 5b each depict two adjacent planes within a stack of uniformly spaced place that comprise the colorant layers of the embodiments disclosed herein.
Figure 5B:
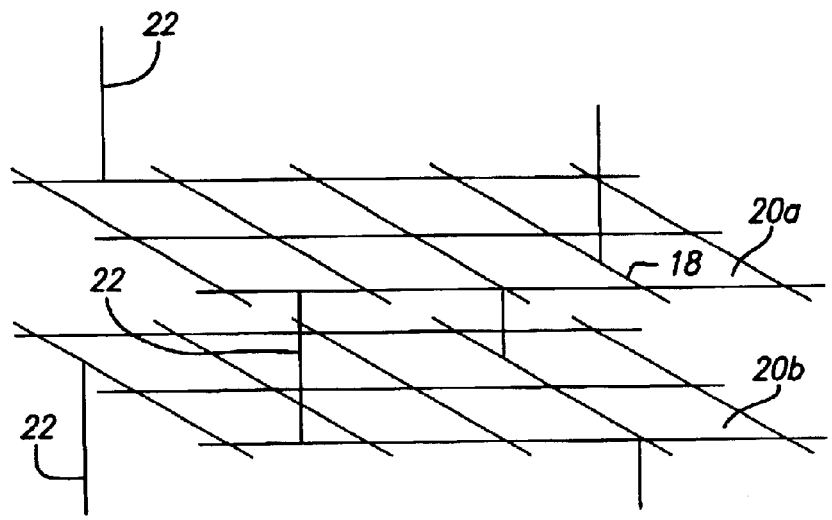

The molecular planes herein must be spaced apart to allow rotor 12 rotation. Several spacing schemes and exemplary spacing chemistries will now be presented. FIGS. 5a and 5b each depict two adjacent planes 20a, 20b within a stack of uniformly spaced planes that compose the colorant layer herein. Each plane 20a, 20b in the figures comprises a honeycomb structure of rotors 12, couplers, 16 and stators 14, 114, 214, 314 as described above. Each spacer line 22 in these figures represents a molecular column that is preferably perpendicular and bound to each of the planes 20a, 20b that it spaces. In FIG. 5a, the spacer 22 is anchored at selected polygon vertices 24 through bonds with corresponding vertex stators, e.g., 14. In FIG. 5b, the spacer 22 is anchored along selected polygon sides 18 through bonds with a side component. Within a given plane, certain spacers are directed toward the plane directly above while others directed toward the plane directly below.

For purposes of self-assembly, it is advantageous for the spacers 22 and their bonded planar components (vertex stators or polygon side components) to be pre-assembled. The pre-assembly serves as a seed for plane growth, two spaced planes growing from each pre-assembly.

Figure 6A:
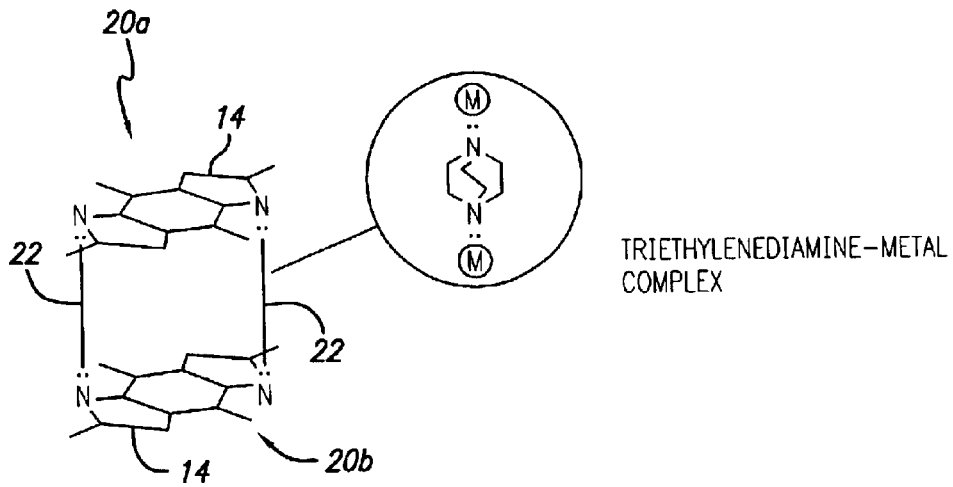
FIGS. 6a and 6b show examples of suitable spacer-vertex stator pre-assemblies and exemplary column assembly chemistry.
Figure 6B:
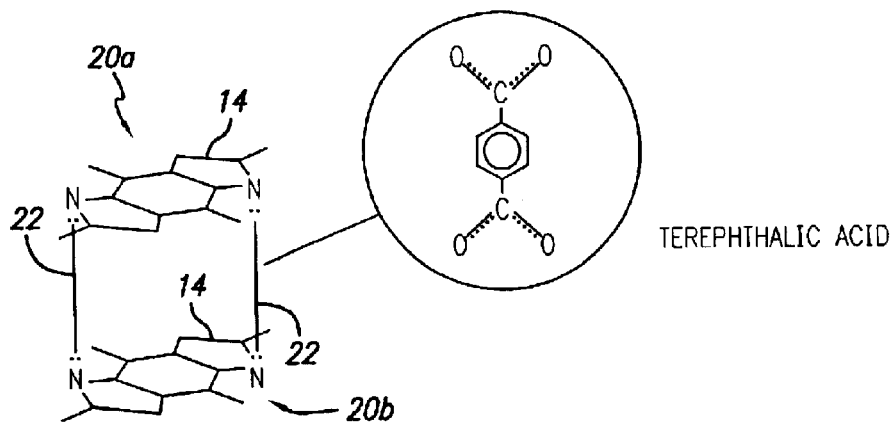

FIGS. 6a and 6b show examples of suitable spacer-vertex stator pre-assemblies and exemplary column assembly chemistry. The stators 14 in these examples have one or more hetero atoms, for example, nitrogen. Due to the planar conformation of the stator 14, the unshared electron pair of the hetero atom(s) typically point orthogonal to the plane 20 of the stator. In some instances, it is advantageous to substitute an alkane group (e.g., methyl group) for a hetero atom hydrogen to assure such orthogonal exposure. This substitution is implied but not explicitly shown in the Figures. As is well known in the chemistry art, the unshared electron pair of hetero atoms form a complex with metal atoms.

In FIG. 6a, the molecular column spacer 22 comprises triethylenediamine complexed on each end with a metal atom. Suitable metal atoms are typically selected from the group of transition metals of the Periodic Table (e.g., Groups 1B–7B and 8). Depending on the selected metal, there may be a need for pre-complexation of the metal, for example with chlorine atoms, to satisfy the valence structure of the metal prior to spacer complexation. N,N'-triethylenediamine, and amines of similar structure, such as 4,4'-bipyridine and pyrazine, have unshared electrons that are directed along the axis of the molecule. Metal complexation of the orthogonal stator and axial spacer unshared electrons orthogonally binds the stators 14 with its common spacer 22.

As shown in FIG. 6a, a stator-spacer pre-assembly may incorporate more than one spacer 22. The multiplicity of spacers 22 promotes a direct superposition of the mated stators 14. Superposition is particularly important in cases where it is desirable to self-assemble planes 20a, 20b that also superimpose in cell structure plane-to-plane. The inter-plane spacing distance may be precisely adjusted by metal as well as the spacer molecule selection. Hetero atoms also undergo acid-base complexation.

The stator-spacer pre-assembly shown in FIG. 6b employs a diacid, terephthalic, as the spacer 22 to space two stators 14. In this case, the resonant carboxylate ions at each end of the diacid are directed axially along the spacer molecule. This similarly promotes acid-base complexation that ionically bonds the two stators 14 orthogonal to the common spacer 22. Multiple spacers 22 may be employed per stator-spacer pre-assembly for the same reason of stator superimposition. As should be obvious, inter-planar spacing may be precisely adjusted by selection of the spacer molecule. It is noted that the same spacer chemistries may be employed without stator-spacer pre-assembly and that many metal-complex and acid-base chemistries may be employed other than those given by example.

Figure 6C:
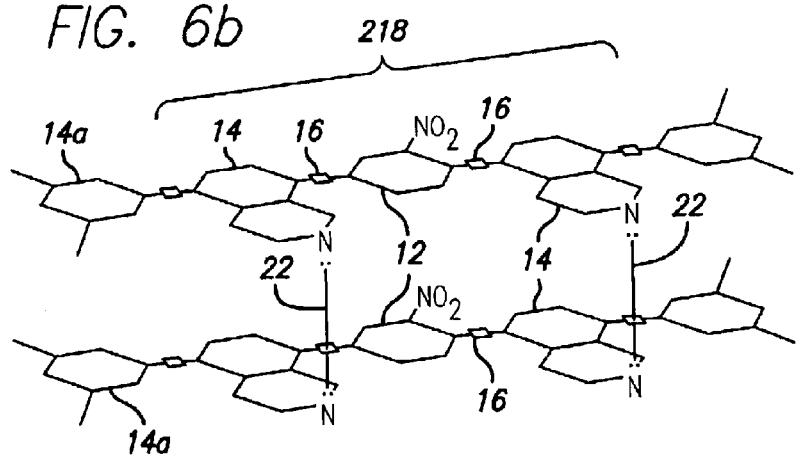
FIG. 6c shows spacer complexation across adjacent polygon side component groups.

FIG. 6c shows spacer complexation across adjacent polygon side component groups. In this example, each spacer 22 bridges the nitrogen groups of isoquinoline stators 14 incorporated in a dye molecule 218 bound between two conjugation terminating 1,3,5-tri(ethynyl) benzene vertex stators 14a. This structure is one version of that shown generically in FIG. 1d. In addition to spacer function, the spacer links 22 are also used as non-coaxial bond points to prevent isoquinoline stator 14 rotation in this example. This restraining scheme allows conventional co-axial dye ring structures to be incorporated as polygon sides in the present honeycomb plane structure with minimum dye alteration. In some cases, it may be desirable to sacrifice selected polygon sides from color conjugation by substitution of a non-switchable link containing bonding sites for spacing. Such bonding sites may promote metal or acid-base complexation or involve conventional reaction chemistries.

Figure 7A:
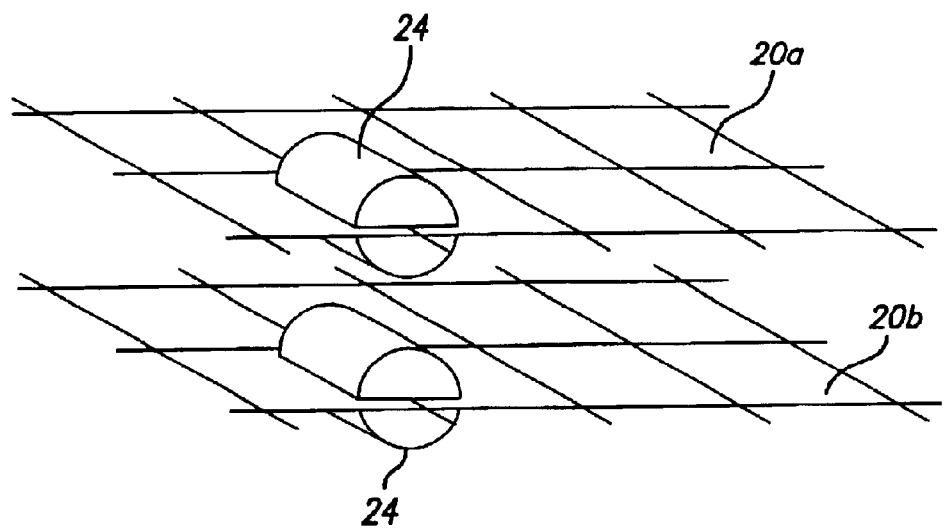
FIG. 7a depicts an alternate inter-plane spacing means.

An alternative inter-plane spacing means is shown in FIG. 7a. Here, adjacent planes 20a, 20b are physically spaced by abutting macrocycles 24 incorporated in each plane. Macrocycles are hollow cylinder-like molecules of sufficient size to allow inclusion and trapping of molecular strands within the inner cavity of the cylinder. The outer diameter of macrocycles is sufficiently large to adequately space adjacent planes for the rotational radius of most single ring rotors anticipated by these teachings. Such macrocycle molecules include, but are not limited to α-, β-, and γ-cyclodextins, cyclo-mannins, cyclogelatins, and cyclo-altrins.

Figure 7B:
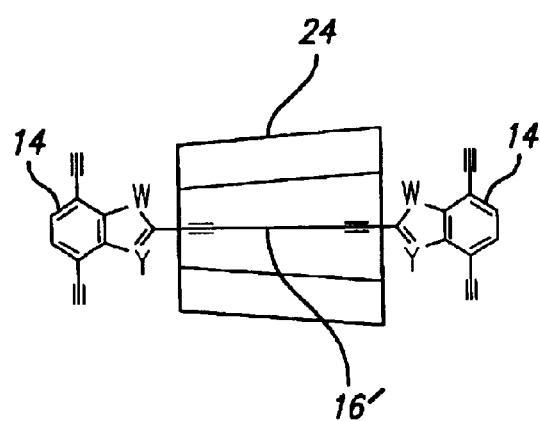
FIG. 7b illustrates the use of a macrocycle spacer incorporated within a plane.

As shown in FIG. 7b, a macrocycle spacer 24 may be incorporated within a plane through a pre-assembly involving the inclusion and capping of a hydrocarbon link 16' within the macrocycle. The hydrocarbon link 16' connects two stators 14. Macrocycle inclusion complexes are well known in the chemical art. A treatise on cyclodextrin inclusion art is found in the publication "Cyclodextrins", Chemical Reviews 1998, Vol. 98, Number 5 (American Chemical Society), and is included herein by reference.

Normally, a hydrocarbon chain 16' is included by heating the macrocycle 24 and hydrocarbon in an aqueous bath. The hydrophobic hydrocarbon chain 16' threads into the relatively hydrophobic macrocycle cavity where its energy state is lower than in free water. Once included, the exposed ends of the hydrocarbon link are reactively capped by stator molecules 14. Periodic placement of the macrocycle within the honeycomb structure of each plane 20a, 20b assures that sufficient overlap of macrocycles occurs to adequately space the planes. In general, macrocycle exterior surfaces are polar and hydrogen bond when placed in close contact. Such hydrogen bonding is advantageous for selfassembly and promoting interplane cohesion. It is well known that the macrocycle surface may be chemically modified. Such modification may, for example, be used to increase inclusion complex solubility or dispersibility in colorant layer coating formulations.

Figure 8:
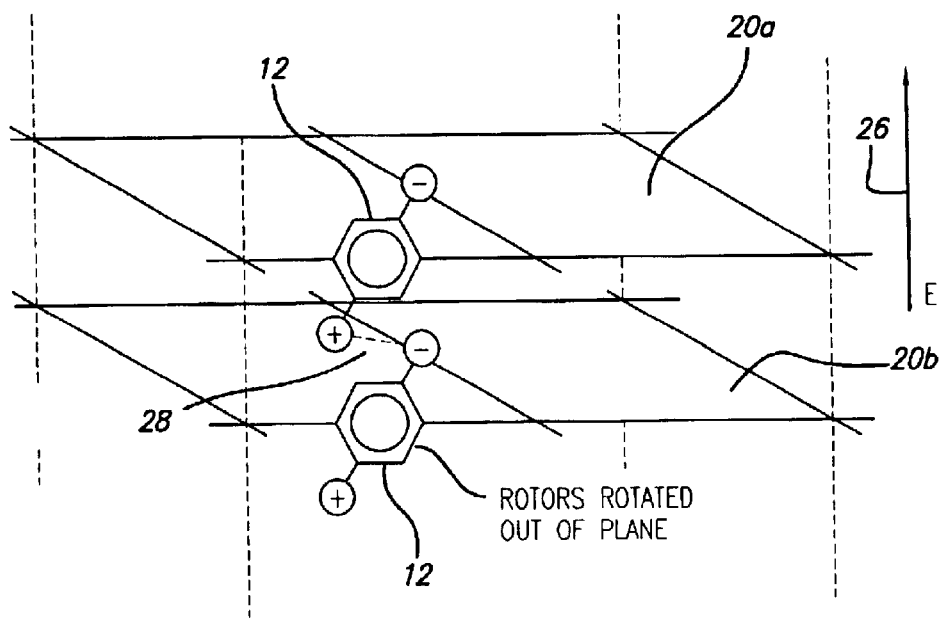
FIG. 8 shows how bi-stable color switching is achieved, based on the embodiments herein, depicting two rotors rotated out of plane by an electric field perpendicular to the plane.

One of the principle embodiments presented in this disclosure is a rotor 12, stator 14, coupler 16, and spacer 24 chemistry that reactively forms uniformly spaced and precisely superimposed honeycomb planes 20a, 20b. In such a structure 10, each rotor 12 is precisely aligned and separated from counterpart rotors located in adjacent planes above and below its own plane. FIG. 8 shows how this provides an inherent means for bi-stable color switching. In the Figure, two rotors 12 are shown rotated out of plane by an electric field (arrow 26) directed perpendicular to the planes 20a, 20b. As the rotors 12 rotate, the torque developed on each rotor diminishes with the cosine of the rotation angle from the plane until the energy rise from de-conjugation to a peak angle is exactly matched by the field induced torque. Normally, the rotor 12 re-laxes back to its zero rotation, planar conformation angle when the field 26 is released. With closely spaced, overlapping rotors 12, however, a dipole force comes into play as the electronegative pole (−) of one rotor approaches the electropositive pole (+) of the adjacent rotor. When the spacing between planes 20a, 20b is sufficiently small, the opposing rotor poles latch with enough force (forming a coulombic latch 28) to hold the rotors near the peak rotation angle in the absence of the electric field 26. With proper spacing, the rotors remain latched indefinitely within a given temperature range and in the absence of an opposing electric field.

In the latched position, the rotor angle is held at a position where the de-conjugation energy equals the rotor torque produced by dipole attraction. This angle will be something less than 90° since the coulomb induced torque has a sine of the rotor angle component that zeros at 90°. The de-conjugation energy also reaches a maximum at the same angle.

To unlatch the rotors, an opposing electric field is applied. The magnitude of the opposing electric field is only sufficient to comfortably assist the de-conjugation energy return the rotor to its zero degree, planar conformation angle. This magnitude must be less than the primary switching electric field; otherwise, the rotor will simply rotate 180° and latch again. The opposing electric field at lower magnitude will instead rotate the rotor past zero degrees to a point short of latching.

Upon release of the opposing electric field, the rotor will again return to its planar, fully conjugated position. The ideal plane spacing will depend upon the size of the rotor, magnitude of its dipole moment, and degree of deconjugation energy imposed by the rotor-stator design. These factors can be computer modeled and adjusted through experimentation.

For some applications, mono-stable switch performance is preferred, requiring larger plane-to-plane spacing or, alternatively, the use of planar structures that do not superimposed rotors plane-to-plane. Each option is fully within the design capability of these embodiments.

The foregoing rotor 12, stator 14, coupler 16, and spacer 22 chemistry is designed for self-assembly in a thick coating layer. Such self-assembly prefers fully symmetrical stators 14, rotors 12, rotor-stator pre-assemblies and spacer-stator pre-assemblies. This promotes a dendrimeric structure that only forms in one way, independent of pre-bond component orientation. Preferably, the coating layer components are dissolved in a suitable solvent with the correct stoichiometric ratios, mixed thoroughly, coated on the desired substrate and reacted in-situ to form the completed coating layer. The individual planes 20 precipitate out of the solution during formation. Other self-assembly techniques such as thin film deposition and 100% solids condensation and radiation curable processes and chemistries are also anticipated. In each case, the reaction process may be assisted by a molecule aligning electric field 26.

The scope and teachings of these embodiments embody a wide range and combination of chemistries and structures. The key inventive concepts are:

the coupling of alternating coaxial rotors and non-coaxial stators to form molecular planes wherein all rotors at rest are parallel to the substrate and orthogonal electric field;

formation of a switchable colorant layer comprising molecular planes spaced through molecular spacer elements to allow free rotor rotation;

formation of honeycomb planes wherein the rotors, stators and couplers form interconnected polygon cells;

a switchable, high extinction coefficient black colorant formed through planes having extensive rotor-stator conjugation;

isometric vertex stators that promote specific isometric polygon cells;

fused hexagon and pentagon ring stators having conjugated 90°, 120° and 180° spaced branches;

polygon cells having colored dye molecule sides coupled to vertex stators having no through conjugation, each dye comprising at least one rotor coupled to two stators;

interplane spacers comprising metal complexes between spacer and stator unshared electron pairs;

interplane spacers comprising acid-base complexation between spacer and stator moieties;

interplane spacers comprising macrocycles;

rotor-stator and stator-spacer pre-assemblies that promote a single, self-assembled dendrimeric colorant layer architecture;

rotors having orthogonal dipole moments; rotor dipoles composed of salts/organo-metal complexes;

plane-to-plane superposition via isometric polygons aligned via spacers coupled at common stator points; and color switch bi-stability through coulombic latching of rotors in adjacent, spacer separated, superimposed planes.

The foregoing discussion is focused toward colorant applications in which a switch transition between a given color and transparency is desired. The scope and teachings of the embodiments taught herein are not limited, however, to these two states or extremes. The present teachings are equally applicable to a broader scope of applications involving a broader set of optical switching effects. For example, an infrared communications router will require switching capability from one refractive index to another wherein visible color states are relatively unimportant. In such cases, the optical properties of the rotors and stators may be adjusted accordingly without departing from the teachings herein. Further, while the color switch has been described as being formed on a substrate, it is also conceivable that a self-assembled film can be formed that requires no substrate.

The present embodiments provide a novel chemistry for producing a molecular film having field switchable color. More particularly, it is a chemistry that provides for relatively thick self-assembled molecular layers collectively having print-like optical density. Further, a means for bi-stable color switching is provided.

The present embodiments introduce several novel structures and chemistries that overcome the prior shortcomings and offer relatively simple solutions to the foregoing challenges. First, the novel colorant layer of the embodiments herein comprises two-dimensional planes of alternating rotor and spacer elements, each plane spaced to minimize non-intentional rotational interference between rotors in adjacent planes. Planar structures are advantageous since they preferentially stack parallel to each other, parallel to the coated substrate and, thereby, perpendicular to the switching electric field. Within each colorant plane, the rotors and stators are each coplanar with the plane as one of the stable conformation states. The collective planarity assures that each rotor dipole within the colorant layer is optimally perpendicular to the electric field at its zero rotation angle state. Several novel means for spacing the parallel planes are provided herein. Second, each rotor is coaxially coupled to adjacent spacers to provide an axis of rotation within the field. Each stator is non-coaxially or more than doubly coupled to adjacent rotors, linkages or spacing groups to prevent rotation. As such, strands or webs of multiple alternating rotors and stators can be included in each plane wherein only the rotors have freedom of rotation. The alternating rotor-stator structure allows extensive contiguous conjugation within the plane, providing large spectral extinction coefficients and commensurately minimum colorant layer thickness for a given desired color optical density. Extensive alternating rotor-stator conjugation also provides an inherent means to produce a black colorant that is readily switched to a transparent state by rotation of rotors. The alternating rotor-stator structure additionally lowers the de-conjugation energy overcome by each rotor by maximizing the rotor to stator ratio. Furthermore, the rotors herein may be ganged to further lower the field requirement. In a preferred embodiment, highly symmetric stator branches are provided for creating self-assembled, honeycomb-like planes with precise overlap of rotors in adjacent planes. This structure provides a direct means for incorporating common colored dye structures and a means for bi-stable switch operation through coulombic latching of the rotor dipoles.

INDUSTRIAL APPLICABILITY

The self-assembled molecular color switch disclosed herein is expected to find use in photonic and nano-scale electronic devices. The planar colorant layer is also a switchable electric conductor having many times greater conductivity than other molecular electronic devices by virtue of the extensive parallel conductive paths.

What is claimed is:

1. A self-assembled molecular color switch comprising coupled coaxial rotors and non-coaxial stators, with each rotor rotatably connected to two stators with a connector about an axis of rotation, forming a plurality of spaced molecular planes of interconnected polygon cells, wherein all rotors at rest are parallel and orthogonal to an electric field.

2. The self-assembled molecular color switch of claim 1 formed on a substrate.

3. The self-assembled molecular switch of claim 2 wherein all rotors at rest are parallel to said substrate.

4. The self-assembled molecular switch of claim 1 comprising said plurality of said molecular planes, spaced apart from adjacent planes.

5. The self-assembled molecular color switch of claim 4 wherein said molecular planes are honeycomb planes formed of said interconnected polygon cells comprising said rotors, said stators, and couplers between said rotors and said stators.

6. The self-assembled molecular color switch of claim 5 wherein each said molecular plane is a switchable colorant layer and each said molecular plane is spaced from an adjacent said molecular plane by molecular spacer elements to allow free rotation of said rotors.

7. The self-assembled molecular color switch of claim 6 wherein said molecular spacer elements between said adjacent molecular planes include metal complexes between said molecular spacer elements and unshared electron pairs of said stators.

8. The self-assembled molecular color switch of claim 7 wherein each said spacer element is selected from the group consisting of N,N'-triethylenediamine, 4,4'-bipyridine, and pyrazine, complexed on each end with a metal atom selected from the group of transition metals of the Periodic Table.

9. The self-assembled molecular color switch of claim 6 wherein said molecular spacer elements between said adjacent molecular planes include acid-base complexation between said molecular spacer elements and said stators.

10. The self-assembled molecular color switch of claim 9 wherein each said molecular spacer element comprises a di-acid.

11. The self-assembled molecular switch of claim 10 wherein said di-acid is terephthalic acid.

12. The self-assembled molecular color switch of claim 6 wherein said molecular spacer elements between said adjacent planes comprise macrocycles.

13. The self-assembled molecular color switch of claim 12 wherein said macrocycles are selected from the group consisting of α-cyclodextins, β-cyclo-dextins γ-cyclodextins, cyclo-mannins, cyclo-gelatins, and cyclo-altrins.

14. The self-assembled molecular color switch of claim 6 comprising superposed molecular planes, each said molecular plane comprising isometric polygons, with alignment of each said molecular plane to said adjacent molecular plane achieved via spacers coupled at common stator points.

15. The self-assembled molecular color switch of claim 14 wherein coulombic latching of rotors in adjacent, spacer-separated, superimposed molecular planes provides color switch bi-stability.

16. The self-assembled molecular color switch of claim 1 comprising a switchable, high extinction coefficient black colorant formed through said molecular planes having extensive rotor-stator conjugation.

17. The self-assembled molecular color switch of claim 1 further including isometric vertex stators that promote specific isometric polygon cells.

18. The self-assembled molecular color switch of claim 17 wherein said vertex stators comprise fused hexagon and pentagon ring stators having conjugated 90°, 120° and 180° spaced branches.

19. The self-assembled molecular color switch of claim 17 comprising polygon cells having colored dye molecule sides coupled to said vertex stators having no through conjugation, each dye molecule comprising at least one rotor coupled to two stators.

20. The self-assembled molecular color switch of claim 1 wherein said rotors have orthogonal dipole moments.

21. The self-assembled molecular color switch of claim 20 wherein said rotor dipoles are selected from the group consisting of metal salts and organometal complexes.

22. The self-assembled molecular color switch of claim 1 comprising rotor-stator and stator-spacer pre-assemblies that promote a single, self-assembled dendrimeric colorant layer architecture.

23. The self-assembled molecular switch of claim 1 wherein at least one rotor comprises one or more coupled rotors.

24. The self-assembled molecular switch of claim 1 wherein said rotors and stators are constructed from elements selected from the group consisting of planar moieties, conjugated single rings, and fused rings, each said moiety having no appreciable spectral absorption in the visible range.

25. The self-assembled molecular switch of claim 24 wherein said conjugated single rings and said fused rings are selected from the group consisting of benzene, naphthalene, anthracene, phenanthrene, pyrrole, furan, thiophene, imidazole, oxazole, thiazole, pyrazole, pyridine, pyrimidine, purine, quinoline, isoquinoline, carbazole, indolizine, indole, isoindole, indoline, benzofuran, benzothiophene, indazole, benzimadazole, benzthiazole, quinolizine, cinnoline, phthalizaine, quinazoline, quinoxaline, naphthyridine, pteridine, indene, azulene, isoxazole, isothiazole, oxadiazole, triazole, thiadiazole, pyran, pyridazine, pyrazine, and triazine.

26. The self-assembled molecular switch of claim 1 wherein said stators comprise a non-cyclic planar moiety.

27. The self-assembled molecular switch of claim 1 wherein said connector also provides conjugation between said rotors and said stators.

28. The self-assembled molecular switch of claim 27 wherein said connector is selected from the group consisting of acetylene, ethane, imine, and azo coupler groups.

29. The self-assembled molecular switch of claim 1 wherein said stators include coupling points and couplers that provide said axis of rotation.

30. The self-assembled molecular switch of claim 1 wherein said rotors include an electric dipole.

31. The self-assembled molecular switch of claim 30 wherein said electric dipole is orthogonal to said axis of rotation.

32. The self-assembled molecular switch of claim 30 wherein said dipole comprises at least one of an electron donor group and an electron acceptor group, which create separated positive and negative charge centers across said rotor.

33. The self-assembled molecular switch of claim 32 wherein said donor and acceptor groups are selected from the group consisting of metal salts and metal complexes.

34. The self-assembled molecular switch of claim 33 wherein said metal salt comprises the reaction product of alkali metals and alkaline earth metals with organic acids and wherein said metal complex comprise at least one metal and at least one electron-withdrawing group.

35. The self-assembled molecular switch of claim 30 wherein said dipole comprises at least one of an electronegative moiety and an electropositive moiety.

36. The self-assembled molecular switch of claim 1 wherein said stators are bonded to rotors through couplers as well as bonded to other functional elements of a dye molecule.

37. The self-assembled molecular switch of claim 1 wherein said other functional elements are selected from the group consisting of inter-planar spacers, linkages between stators within a given plane, auxochromic moieties that tune the absorption spectra of the rotor-stator chromophore, photo-stabilizing moieties, photon-energy dissipation moieties, coating solution solubilizing groups and coating solution dispersing groups.

38. The self-assembled molecular switch of claim 1 wherein said stators have at least two non-coaxial bonding points to prevent formation of an axis of rotation, thereby preventing said stators from rotating.

39. The self-assembled molecular switch of claim 1 wherein at least some stators are chromophoric in that they add conjugation to a circuit of rotors and stators.

40. The self-assembled molecular switch of claim 1 wherein at least some stators terminate conjugation so that conjugation is broken across branches of said at least some stators.

41. The self-assembled molecular switch of claim 1 wherein said polygon cells are uniform in size and isometric in vertex angle and side length to promote a fully uniform honeycomb plane having no interior fragments.

42. The self-assembled molecular switch of claim 41 wherein each polygon cell has a plurality of vertices and sides connecting said vertices, with each vertex occupied by a said stator, said stator having at least three branches for coupling to elements in said sides of said polygon cell and mating sides of adjacent cells in said honeycomb.

43. The self-assembled molecular switch of claim 42 wherein each said stator has fully symmetrical branches emanating from its vertex point so that stator orientation within a plane does not impact formed cell structure or integrity.

44. The self-assembled molecular switch of claim 43 wherein each said stator has three symmetrical branches emanating from its vertex point comprising the following structure:

where S is the stator.

45. The self-assembled molecular switch of claim 44 wherein each said polygon cell has the following structure:

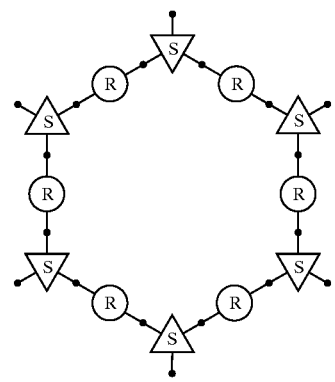

where S is a stator, R is a rotor, and the black dots between the stator and rotor is a coupler.

46. The self-assembled molecular switch of claim 45 wherein each said stator has the following structure:

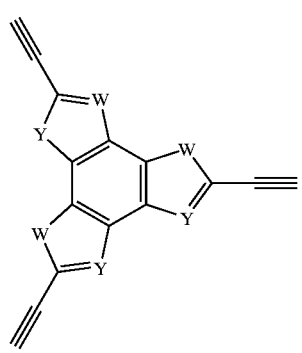

where the Y and W atom designations refer to atom substitutions including, in addition to carbon, nitrogen, oxygen, sulfur, phosphorus, arsenic or other common ring substituents, as appropriate with the given valence constraints.

47. The self-assembled molecular switch of claim 46 wherein each said molecular plane comprises a plurality of interconnected polygon cells having the following structure:

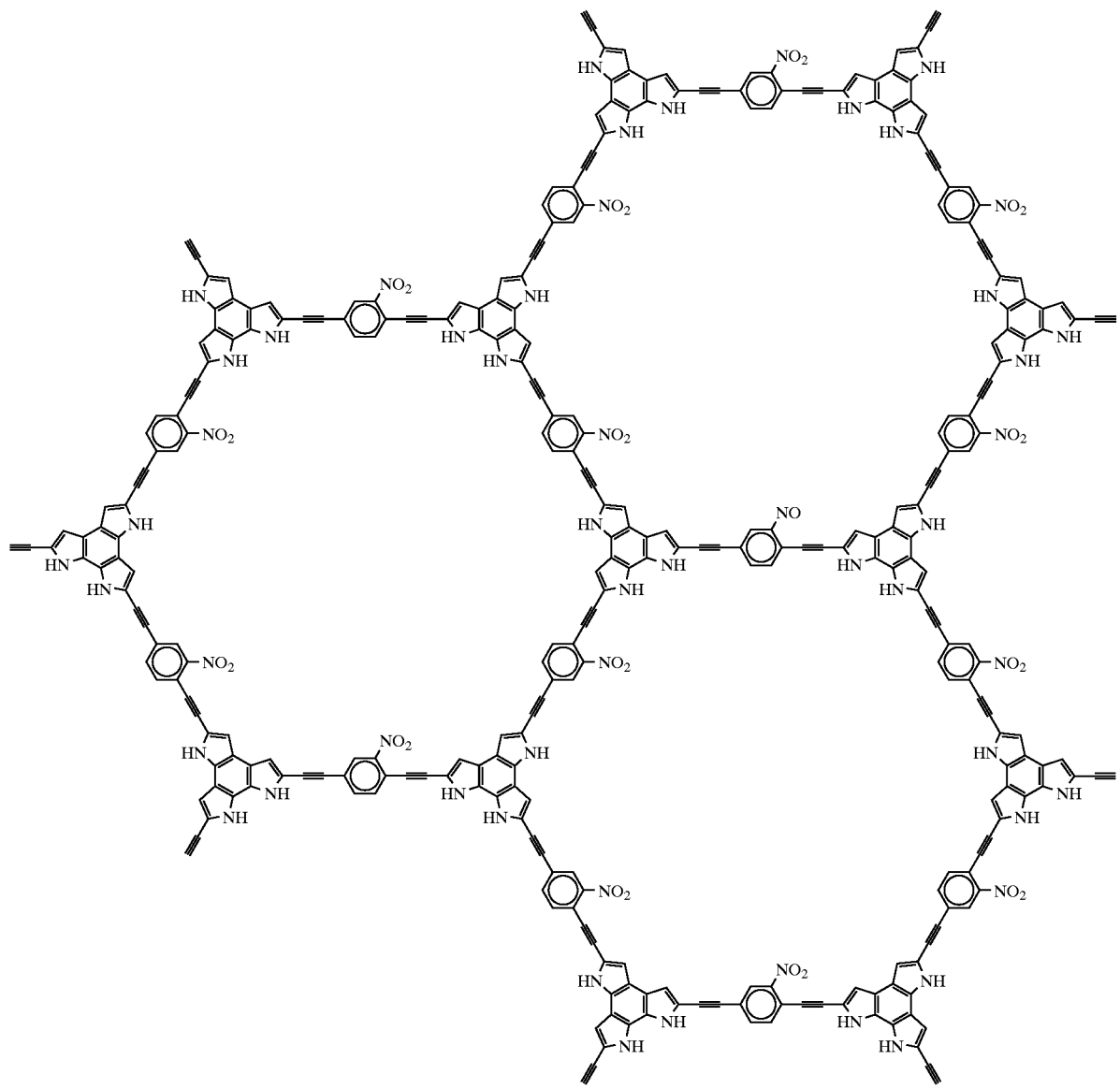

to form said honey comb plane.

48. The self-assembled molecular switch of claim 47 wherein said stator is a 2,5,8-tri(ethynyl)-trisindene, where Y and W are each selected from the group consisting of carbon, nitrogen, oxygen, sulfur, phosphorus, and arsenic.

49. The self-assembled molecular switch of claim 48 wherein said stator is 2,5,8-tri(ethynyl)benzo-trispyrrole and said rotor is nitrobenzene, with said connector thereby being acetylene.

50. The self-assembled molecular switch of claim 41 wherein each said stator has four symmetrical branches emanating from its vertex point comprising the following structure

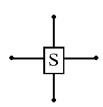

where S is the stator.

51. The self-assembled molecular switch of claim 50 wherein each said polygon cell has the following structure:

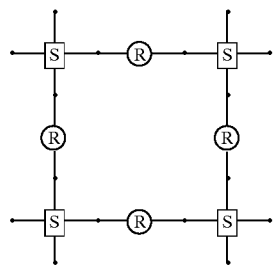

where S is a stator, R is a rotor, and the black dot between the stator and rotor is a coupler.

52. The self-assembled molecular switch of claim 51 wherein each said polygon cell has two different stator configurations, both configurations having four symmetrical branches emanating from its vertex point, with a first configuration having —C—C— connectors at all four branches comprising the following structure:

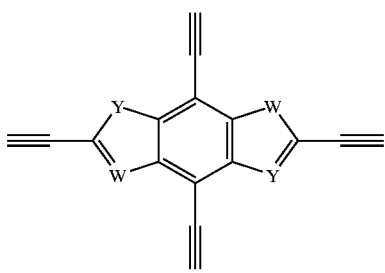

and a second configuration having two —CXC— connectors at two opposed branches and having two —CHC—CMC— connectors at two opposed branches comprising the following structure:

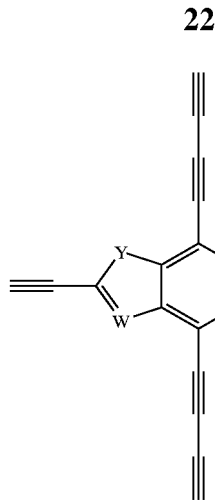

where the Y and W atom designations refer to atom substitutions including, in addition to carbon, nitrogen, oxygen, sulfur, phosphorus, arsenic.

53. The self-assembled molecular switch of claim 52 wherein each said molecular plane comprises a plurality of interconnected polygon cells having the following structure:

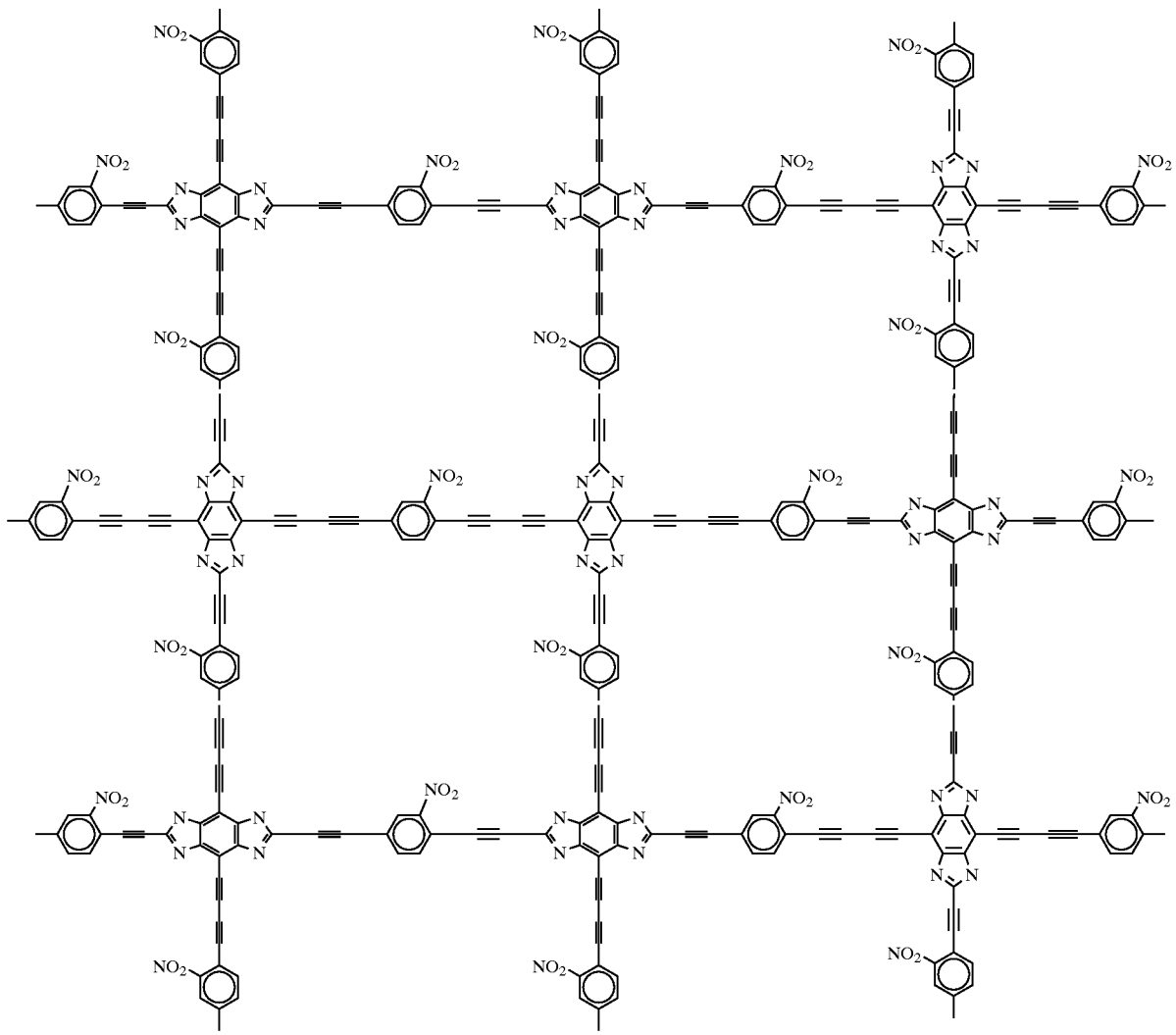

to form said honeycomb plane.

54. The self-assembled molecular switch of claim 53 wherein said stator having said first configuration is 2,5,7,8-tetra(ethynyl) bisindene, where Y and W are carbon and wherein said stator having said second configuration is 2,5-diethynyl-7,8-di(ethynyl ethynyl) bisindene, where Y and W are independently selected from the group consisting of carbon, nitrogen, oxygen, sulfur, phosphorus, and arsenic.

55. The self-assembled molecular switch of claim 54 wherein said stator is 2,5-di(ethynyl)-7,8-di(ethynyl ethynyl)-benzo-bisimidazole and wherein said rotor is nitrobenzene, with a first pair of opposed connectors thereby being acetylene and with a second pair of opposed connectors thereby being two acetylenes in tandem.

56. The self-assembled molecular switch of claim 41 wherein each said stator has three asymmetrical branches emanating from its vertex point comprising the following structure.

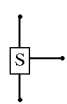

where s is a stator.

57. The self-assembled molecular switch of claim 56 wherein each said polygon cell has the following structure:

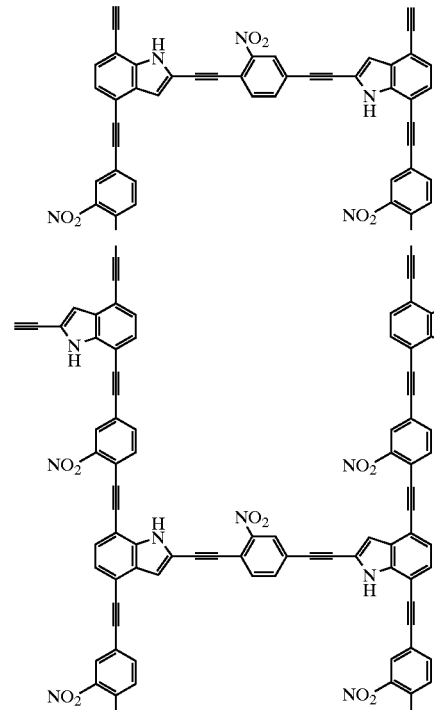

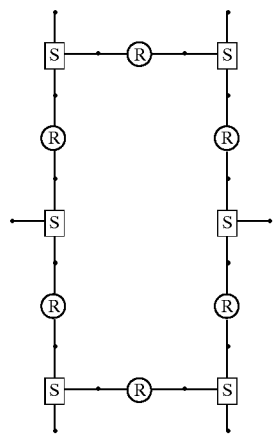

where S is a stator, R is a rotor, and the black dot between the stator and rotor is a coupler.

58. The self-assembled molecular switch of claim 57 wherein each said stator has the following structure:

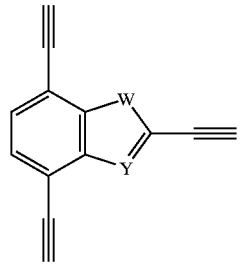

where the Y and W and atom designations refer to atom substitutions including, in addition to carbon, nitrogen, oxygen, sulfur, phosphorus, arsenic.

59. The self-assembled molecular switch of claim 58 wherein each said molecular plane comprises a plurality of interconnected polygon cells having the following structure:

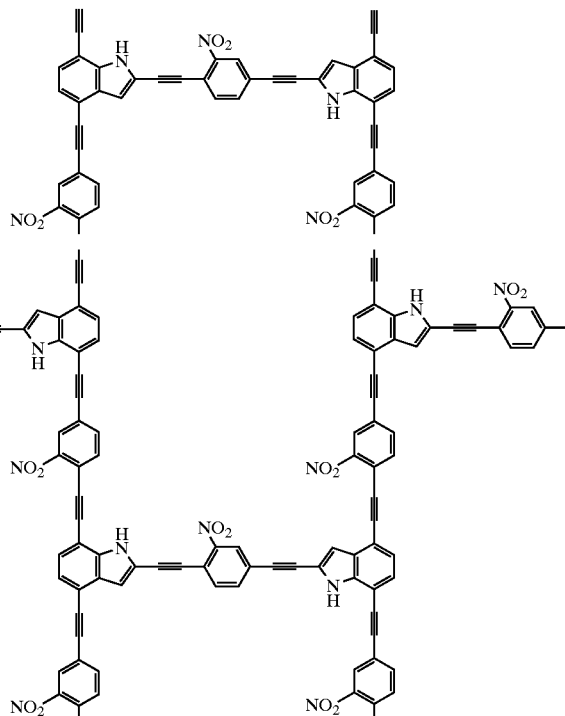

-continued

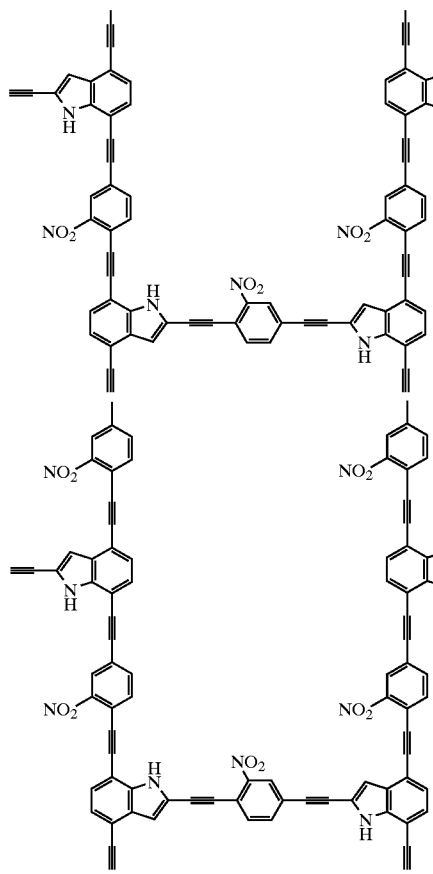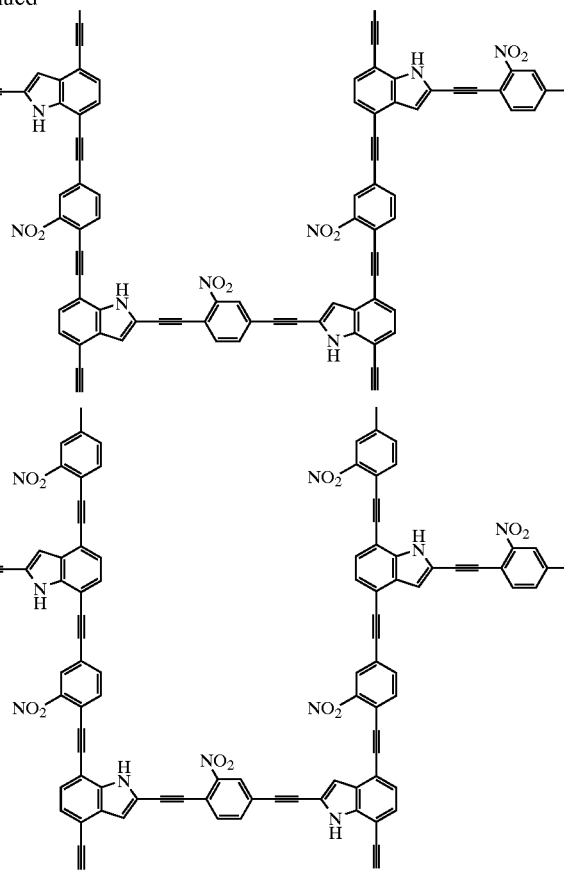

to form said honeycomb plane.

60. The self-assembled molecular switch of claim 41 wherein each said polygon cell has two different stator configurations, a first configuration having three symmetrical branches emanating from its vertex point comprising the following structure:

and a second configuration having two rotationally symmetric branches emanating from its vertex point comprising the following structure:

where S is the stator.

61. The self-assembled molecular switch of claim 60 wherein each said polygon cell has the following structure:

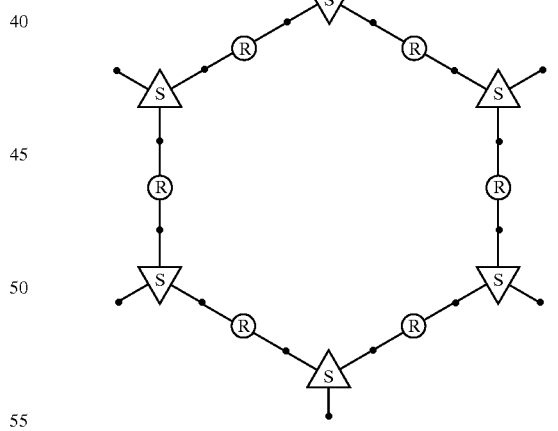

where S is a stator, R is a rotor, and the black dot between the stator and rotor is a coupler.

62. The self-assembled molecular switch of claim 61 wherein said stator is a 2,4,7-(triethynyl) indene, where Y and W are each selected from the group consisting of carbon, nitrogen, oxygen, sulfur, phosphorus, and arsenic.

63. The self-assembled molecular switch of claim 62 wherein said stator is 2,4,7-tri(ethynyl) indole and said rotor is nitrobenzene, with said connector thereby being acetylene.

* * * * *